(12) United States Patent
Gassert (10) Patent No.: US 7,647,828 B2
(45) Date of Patent: Jan. 19, 2010

(54) METHOD FOR MEASURING AND/OR REGULATING THE OSCILLATION AMPLITUDE OF AN ULTRASONIC TRANSMITTER, AND AN ULTRASONIC WELDING DEVICE

(75) Inventor: Frank Gassert, Bischoffen (DE)

(73) Assignee: Schunk Ultraschalltechnik GmbH, Wettenburg (DE)

( * ) Notice: Subject to any disclaimer, the term of this patent is extended or adjusted under 35 U.S.C. 154(b) by 602 days.

(21) Appl. No.: 10/582,325

(22) PCT Filed: May 27, 2005

(86) PCT No.: PCT/EP2005/005774
§ 371 (c)(1),
(2), (4) Date: Jun. 9, 2006

(87) PCT Pub. No.: WO2005/116593
PCT Pub. Date: Dec. 8, 2005

(65) Prior Publication Data
US 2009/0013786 A1    Jan. 15, 2009

(30) Foreign Application Priority Data
May 28, 2004  (DE) .................. 10 2004 026 826

(51) Int. Cl.
*B23K 20/10* (2006.01)
*G01N 29/04* (2006.01)

(52) U.S. Cl. .................. 73/582; 73/588; 228/102; 228/1.1; 228/8

(58) Field of Classification Search .................. 73/582, 73/588; 228/102, 1.1, 8
See application file for complete search history.

(56) References Cited

U.S. PATENT DOCUMENTS

| 3,857,279 | A  | * | 12/1974 | Selzer et al. ................ 73/582 |
| 4,854,494 | A  |   | 8/1989  | Von Raben |
| 5,199,630 | A  |   | 4/1993  | Felber et al. |
| 5,884,835 | A  | * | 3/1999  | Kajiwara et al. ......... 228/110.1 |
| 6,279,810 | B1 |   | 8/2001  | Chan-Wong et al. |
| 6,286,747 | B1 | * | 9/2001  | Chan et al. ................ 228/1.1 |
| 6,827,247 | B1 | * | 12/2004 | Fan et al. .................. 228/1.1 |

FOREIGN PATENT DOCUMENTS

| DE | 2823361 | 12/1979 |
| DE | 2946154 | 6/1981 |
| GB | 1496137 | 12/1977 |

* cited by examiner

*Primary Examiner*—Hezron Williams
*Assistant Examiner*—Rose M Miller
(74) *Attorney, Agent, or Firm*—Dennison, Schultz & MacDonald (57) ABSTRACT

The invention relates to a method for measuring and/or regulating the oscillation amplitude of an ultrasound oscillator of an ultrasound device. In order to be able to measure or regulate the oscillation amplitude of the ultrasound oscillator in a simple manner, it is proposed that a sensor capturing the oscillation amplitude be associated with at least one component element of the ultrasound oscillator.

13 Claims, 6 Drawing Sheets

METHOD FOR MEASURING AND/OR REGULATING THE OSCILLATION AMPLITUDE OF AN ULTRASONIC TRANSMITTER, AND AN ULTRASONIC WELDING DEVICE

This application is a filing under 35 USC 371 of PCT/EP2005/005774, filed May 27, 2005.

BACKGROUND OF THE INVENTION

The invention relates to a method for measuring and/or regulating the oscillation amplitude of an ultrasound oscillator of an ultrasound welding device, comprising components producing and transmitting oscillations in the form of at least one converter and one sonotrode, as well as, if applicable, a booster placed between the converter and the sonotrode, wherein the ultrasound oscillations are produced by transmitting a high frequency voltage coming from a control circuit to the converter. In addition, the invention relates to an ultrasound welding device, comprising components producing and transmitting oscillations in the form of at least one converter and one sonotrode, as well as, if applicable, a booster placed between them, a backing electrode (ambos), between which and the sonotrode compressible, weldable parts, such as wires, are to be placed, preferably in a compression chamber, wherein to the converter for oscillation production an amplitude is transmitted across a control system with high frequency voltage.

In order to obtain reproducible welding results, it is necessary to monitor welding parameters and then, if predetermined target values are exceeded or not met, regulate them. It is thus disclosed in DE-A-198 10 509 to capture ultrasound waves coupling into a welding material following a reciprocal effect with a joined layer as the measuring signal, in order to then further process characteristic parameters by means of a measured data memory and an evaluation unit for the welding process with subsequent control of the sonotrode.

In order to control and regulate the process parameters in the ultrasound welding of plastic parts, DE-A-43 21 874 proposes that the joining force be measured during the welding process to monitor the energy application at a joining location between two parts that are to be welded.

According to EP-B-0 567 426 the oscillation amplitude of a sonotrode welding plastic parts is reduced after a predetermined time interval, in order to then work with a lower oscillation amplitude during the remaining time of the welding operation. An appropriate control signal to reduce the amplitude can also be initiated directly or indirectly as a function of the power transmitted to the work pieces to be welded, as is revealed, for example, in WO-A-1998/49009, U.S. Pat. Nos. 5,855,706, 5,658,408 or 5,435,863.

WO-A-2002/098636 discloses a method for welding plastic parts, in which during an initial time span the oscillation amplitude is reduced following a given course to optimize the welding process, in order to subsequently perform a measurement of a characteristic parameter of the work piece and then, as a function of the value of the parameter measured, end the welding process with a constant amplitude of a sonotrode transmitting ultrasound energy.

In order to check connections established by ultrasonic wire bonding, DE-A-101 10 048 envisions an online monitoring method on the basis of predetermined or stored master values, which allow inferences to be made about the stability of the connection.

An ultrasound welding method for coated electrical wires and a device for performing the method are disclosed in DE-A-102 11 264. In order to vary the welding energy after removal of the insulation and for the welding of the conductors, a measurement of the resistance of the electricity flowing between the sonotrode and the backing electrode is carried out.

SUMMARY OF THE INVENTION

The underlying problem of the present invention is to provide a method of the type named at the outset with which the oscillation amplitude of an ultrasound oscillator can measured and/or regulated in a simple manner.

To solve this problem, the invention essentially provides that a sensor detecting the oscillation amplitude is associated with at least one component of the ultrasound oscillator and that signals corresponding to the oscillation amplitudes determined by this sensor are monitored and/or are compared with the expected signals in the control circuit or the measuring and monitoring device and that, as a function of deviations occurring between the actual and expected signals, the high frequency voltage transmitted to the converter or the transmitted high frequency current is varied. A regulating process takes place.

According to the invention so-called amplitude feedback occurs in order to control the amplitude of the ultrasound oscillator such that reproducible and optimal welding results are attainable.

Amplitude feedback, however, also serves the mutual tuning of different oscillators in order to be able to compensate for possible amplitude deviations between the individual oscillators. In addition, amplitude feedback offers the possibility of compensating for amplitude changes of an ultrasound oscillator which are caused by deterioration.

Limit temperatures at the converter also can be acquired by means of a frequency shift of the operating point and thus be compensated for. Finally, if impermissibly high amplitudes occur, the production of ultrasound oscillation can be interrupted so that safety functions can be satisfied.

In addition there is also the possibility, thanks to the invention, of determining any deterioration of the piezo-ceramic discs producing the oscillations or changes in electrical variables, such as the high frequency voltage signal of the control system, for example of the generator. The load/no-load behavior of the converter can also be detected by means of amplitude feedback.

A piezo-ceramic sensor in particular can be used. It can be integrated into the converter, wherein in addition to the active piezo-ceramic discs, by means of which the ultrasound oscillations are produced, a piezo-ceramic disc is used, from which signals for the purpose of determining the amplitude are produced and accessed, on the basis of the pressure application produced by the other piezo-ceramic discs. An optical detection of the amplitudes, e.g. by means of a laser, however, is also possible. Other sensors, such as ohmic sensors, e.g. elongation measurement tape sensors, acceleration sensors, or acoustic sensors can also be used.

If the sensor is preferably integrated into the converter, there is the possibility of placing a corresponding sensor on or in the booster, on or in the sonotrode, on the converter housing or at a mount or receptacle of the ultrasound oscillator, in order to generate the desired signals and thus allow monitoring or control of the amplitudes.

In order to facilitate optimal amplitude detection and thus feedback, it is provided that the sensor is placed at the maximum oscillation of the component elements, especially the converter. In the process the masse of the sensor should be designed such that a noticeable mass falsification of the component element does not occur. In addition, the sensor should be connected such to the component that the sensor oscillates in tune with the component.

The signals of the sensor can be evaluated in that the alternating signals produced by the sensor are compared with those of the high frequency current and the high frequency voltage source. Here, too, there is the possibility of rectifying the alternating voltage signals obtained from the sensor and to make them available to the control system as direct voltage signals for regulating purposes. In the process the actual value of the direct voltage signals should be between 0 and 10 volts.

In a further development of the invention it is provided that the control signals are present at the input of a differential amplifier with a comparator, that the high frequency current and the high frequency voltage signals of the control system are present at another input of the differential amplifier, and that the output signal of the comparator forms the basis for regulating the high frequency voltage and the high frequency current.

In order to determine the oscillation frequency it is also provided that the sensor signals are sent to a comparator and are transformed into voltage pulses with the oscillation frequency of the signals and then are sent to a counter. In the process the signals can be present at a counter input, e.g., a PLC control system.

The invention is in particular also characterized by an ultrasound welding device of the type named at the outset, wherein a sensor detecting the amplitude is associated with at least one component element. This sensor in particular is a piezo-ceramic sensor. A capacitive or inductive sensor, a resistance sensor, such as an elongation measurement strip sensor, an optical sensor, or an acceleration sensor can also be used. Independently thereof, the sensor can be positioned on or in the converter, on or in the booster, on or in the sonotrode, in a housing surrounding the converter, or at a mount of the ultrasound oscillator. A sensor can also be placed on the basic body of the welding module and at the receptacle for the oscillator and the compression chamber. In this case, the sensor for detecting the amplitude is a contactless sensor, such as an optical sensor.

Preferably, however, a piezo-ceramic sensor is used. The invention is also characterized by an ultrasound welding device, in which the converter comprises several first piezo-ceramic discs able to be put into oscillation, which discs are placed between a converter nut and a pin and are tensioned between them by a first bolt element, which protrudes over the outer surface of the resonator body, wherein the first bolt element comprises a tapped blind hole starting at the front area running from the converter nut side, into which hole a second bolt element can be screwed, with which the piezo-ceramic sensor is tensioned in relation to the first bolt. In the process the piezo-ceramic sensor comprises in particular two piezo-ceramic breaker plates, each of which has an outer diameter AD of $15\,mm \geq AD \geq 10\,mm$ and/or an inner diameter ID of $8\,mm \geq ID \geq 4/mm$ and/or a thickness D of $1.5\,mm \geq D \geq 0.5\,mm$. The electrodes needed to acquire the signals and running on the respective outer area of the piezo-ceramic breaker discs are preferably baked silver electrodes. In the process the outer electrodes have a ground voltage.

BRIEF DESCRIPTION OF THE DRAWING

Further details, advantages and characteristics of the invention result not only from the claims, the characteristics revealed in them by themselves and/or in any combination, but also from the following description of preferred embodiments shown in the drawings.

Seen are.

DESCRIPTION OF THE PREFERRED EMBODIMENTS

Figure 1:
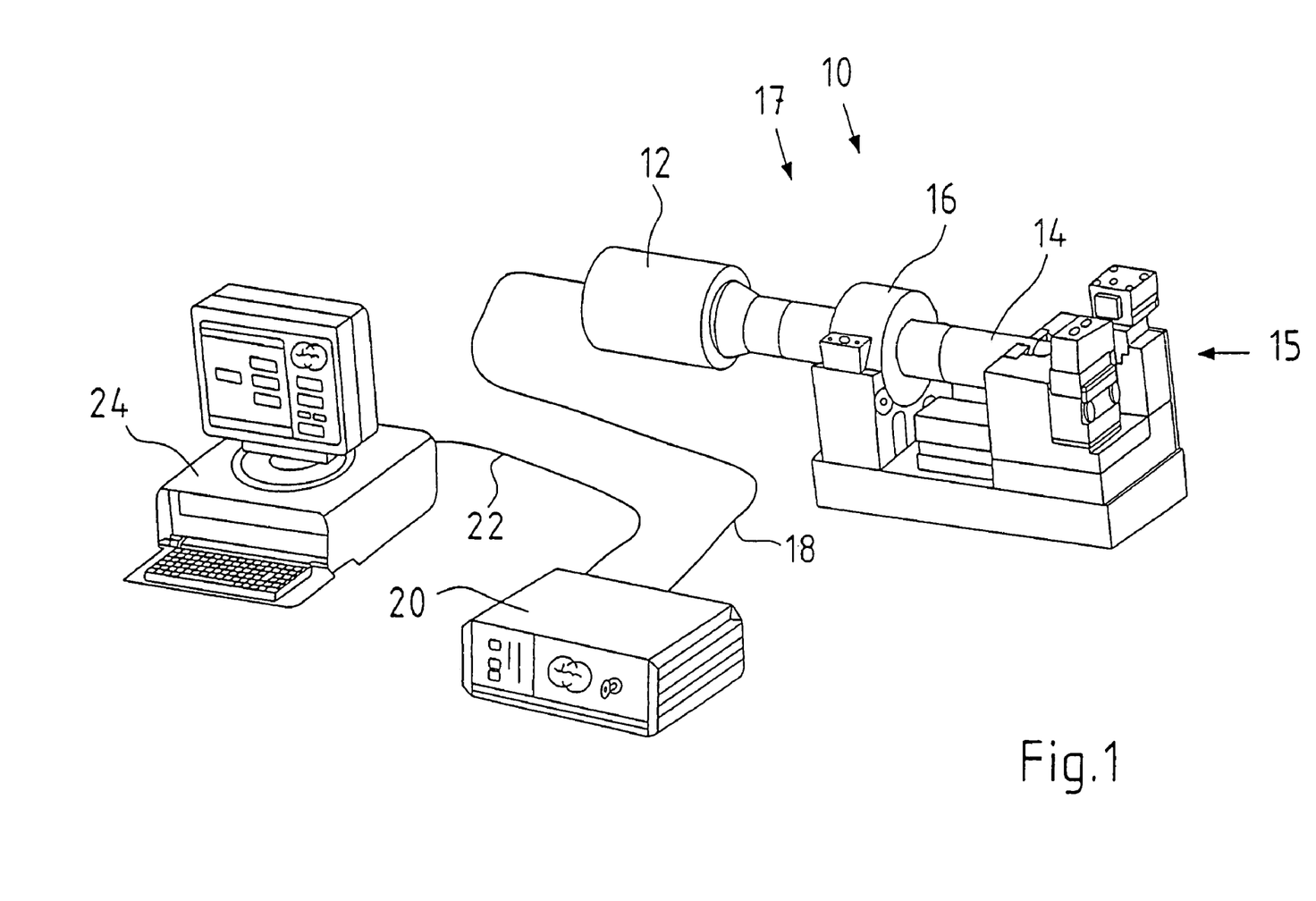
FIG. 1: A principle depiction of an ultrasound welding device with periphery.

FIG. 1 is a basic depiction of an arrangement for welding parts, in particular wires, by ultrasound. The arrangement comprises an ultrasound welding device or machine 10, which includes in the usual manner a converter 12 and a sonotrode 14 as well as a backing electrode or ambos 15 associated therewith. In the embodiment, a booster 16 is placed between the converter 12 and the sonotrode 14, above which the ultrasound oscillator 17 is placed, which consists of the converter 12, the sonotrode 14 and the booster 16. The backing electrode 15 associated with the sonotrode 14 or its sonotrode head comprising a welding area can be constructed in several parts, as disclosed in U.S. Pat. Nos. 4,596,352 or 4,869,419, in order to provide a compression chamber with an adjustable cross-section in which the elements to be welded, such as the wires, are placed.

The converter 12 is connected via a line 18 to a generator 20, which is in turn connected by a line 22 with a computer 24. A high frequency voltage from the generator 20 is transmitted to the converter 12, i.e. to the piezo-ceramic discs located therein, in order to expand or contract the discs accordingly, thus producing ultrasound oscillations with an amplitude, which are transmitted via the booster 16 to the sonotrode 14.

In order to be able to detect and monitor the amplitude or, if necessary, regulate the desired expected values, so-called amplitude feedback occurs according to the invention, i.e., the amplitude of a component element of the ultrasound oscillator 17, i.e. the converter 12 and/or the booster 16 and/or the sonotrode 14, is measured and fed back to the control system 20 in order to compare the measured actual amplitudes with the expected amplitude values or expected amplitude ranges stored in the computer 24. Expected amplitude range means a bandwidth of properly evaluated expected amplitudes. If actual amplitude is above or below the expected amplitude bandwidth, then a readjustment of the high frequency voltage can occur in the generator present in the control system 20, in order to change the actual amplitude.

In order to detect the amplitude, i.e. to associate a sensor with a component element of an oscillator system 15, there are a variety of possibilities, of which several are illustrated, for example, in FIGS. 2 to 6.

Figure 2:
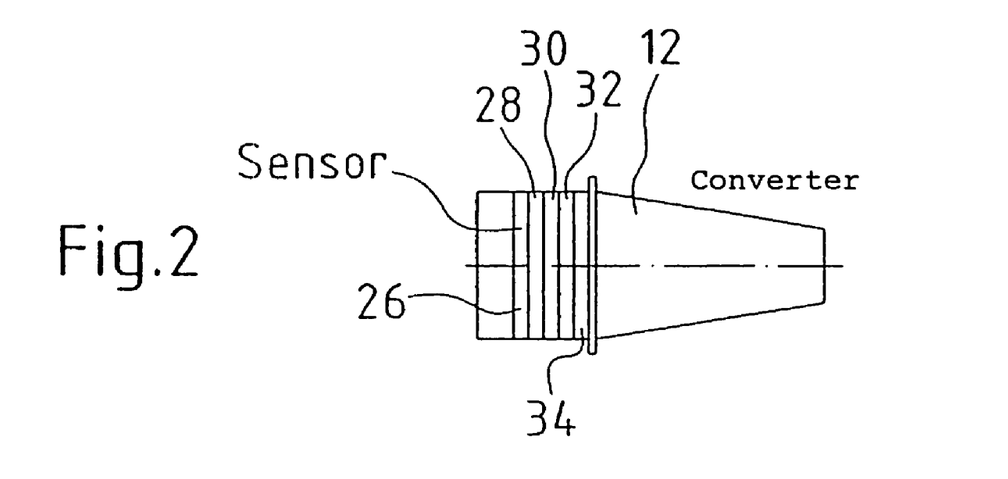
FIG. 2: A first embodiment of a converter with sensor.

Preferably a sensor 26 is integrated or placed in or on the converter 12. The sensor 26 can be a piezo-ceramic sensor, which is positioned in the converter 12 together with the additional piezo-ceramic discs 28, 30, 32 and 34 present, to which a high frequency voltage is applied in the known manner in order to produce the ultrasound oscillations with the desired amplitude and desired frequency by means of expansion or contraction of the piezo-ceramic discs 28, 30, 32 and 34. As a result, the discs 28, 30, 32 and 34 are active parts, while the sensor 26 is designated as a passive part, since a high frequency signal is produced by the pressure conveyed to the sensor 26 from the discs 28, 30, 32 and 34, which signal provides information about the amplitude.

Figure 3:
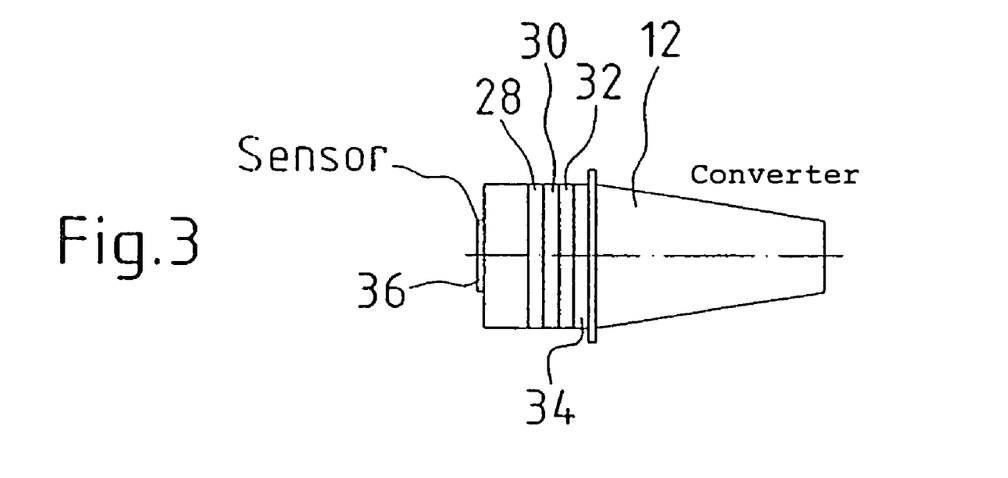
FIG. 3: A second embodiment of a converter with sensor.

In the embodiment of FIG. 3, a sensor 36 is placed on the back end face of the converter 12, namely on the outside at the resonator or converter nut, and is tensioned by it in order to produce a signal as a function of the oscillation amplitudes produced by the discs 28, 30, 32 and 34.

Figure 4:
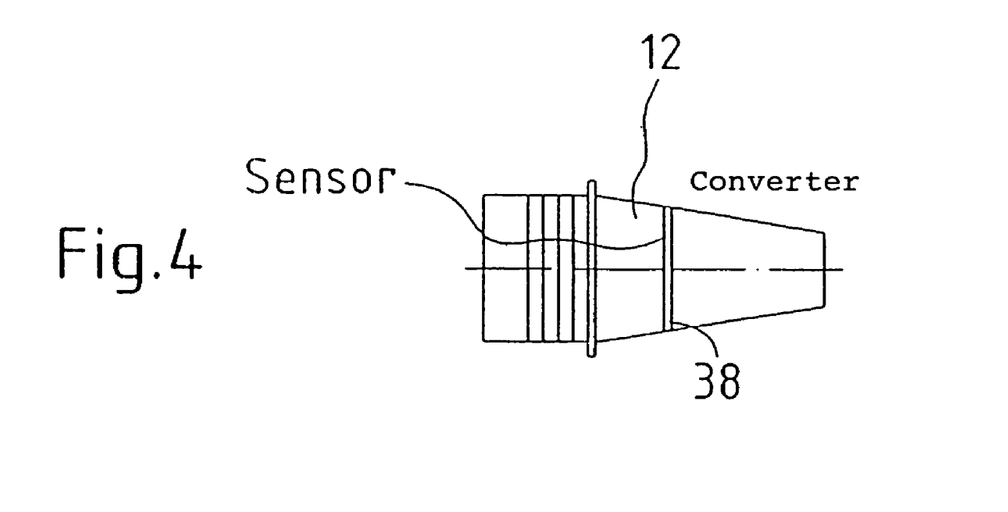
FIG. 4: A third embodiment of a converter with sensor.

A sensor 38 can also be positioned in the pin of the converter 12, as shown in FIG. 4.

Figure 5:
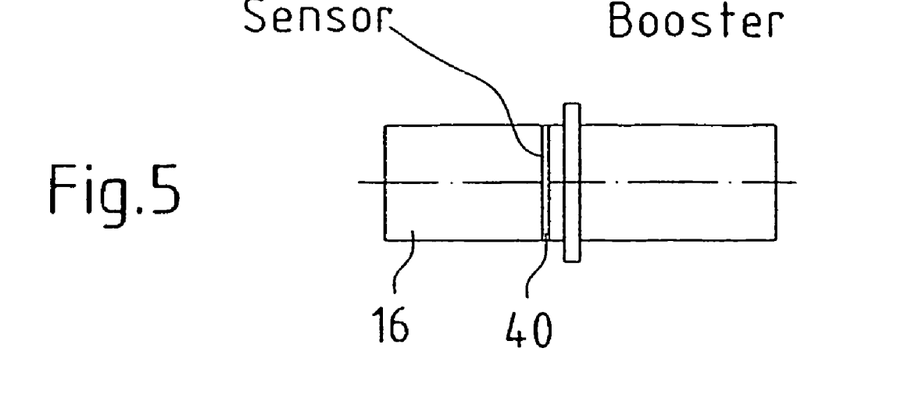
FIG. 5: A booster with a sensor.
Figure 6A:
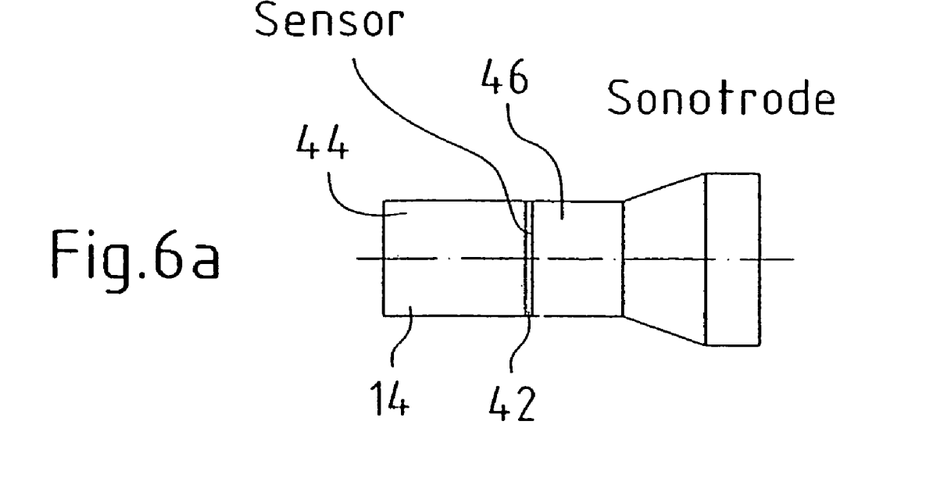
FIG. 6: A sonotrode with sensor.
Figure 6B:
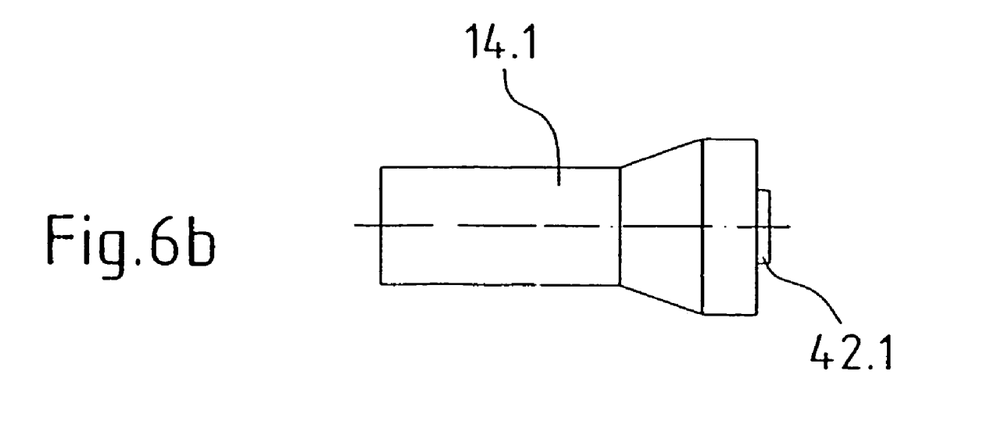

If it is preferred to place the sensor in or on the converter, it is also possible to integrate a sensor 40 in the booster 16, as shown in FIG. 5.

A corresponding design can also occur with respect to the sonotrode 14. According to the drawing depiction of FIG. 6, a preferably piezo-ceramic disc is tightened as a sensor 42 in the sonotrode 14, i.e. between sections 44 and 46, wherein the sensor 42 defines a plane extending vertically to the oscillator longitudinal axis, as in the embodiments of FIGS. 2 to 5.

If, as mentioned, a piezo-ceramic sensor is preferred as the amplitude sensor, other sensors are nonetheless equally suitable. For example, inductive sensors, capacitive sensors, optical sensors, such as laser sensors, acoustic sensors, acceleration sensors or resistance sensors, such as measurement tape sensors, can be mentioned.

Figure 7:
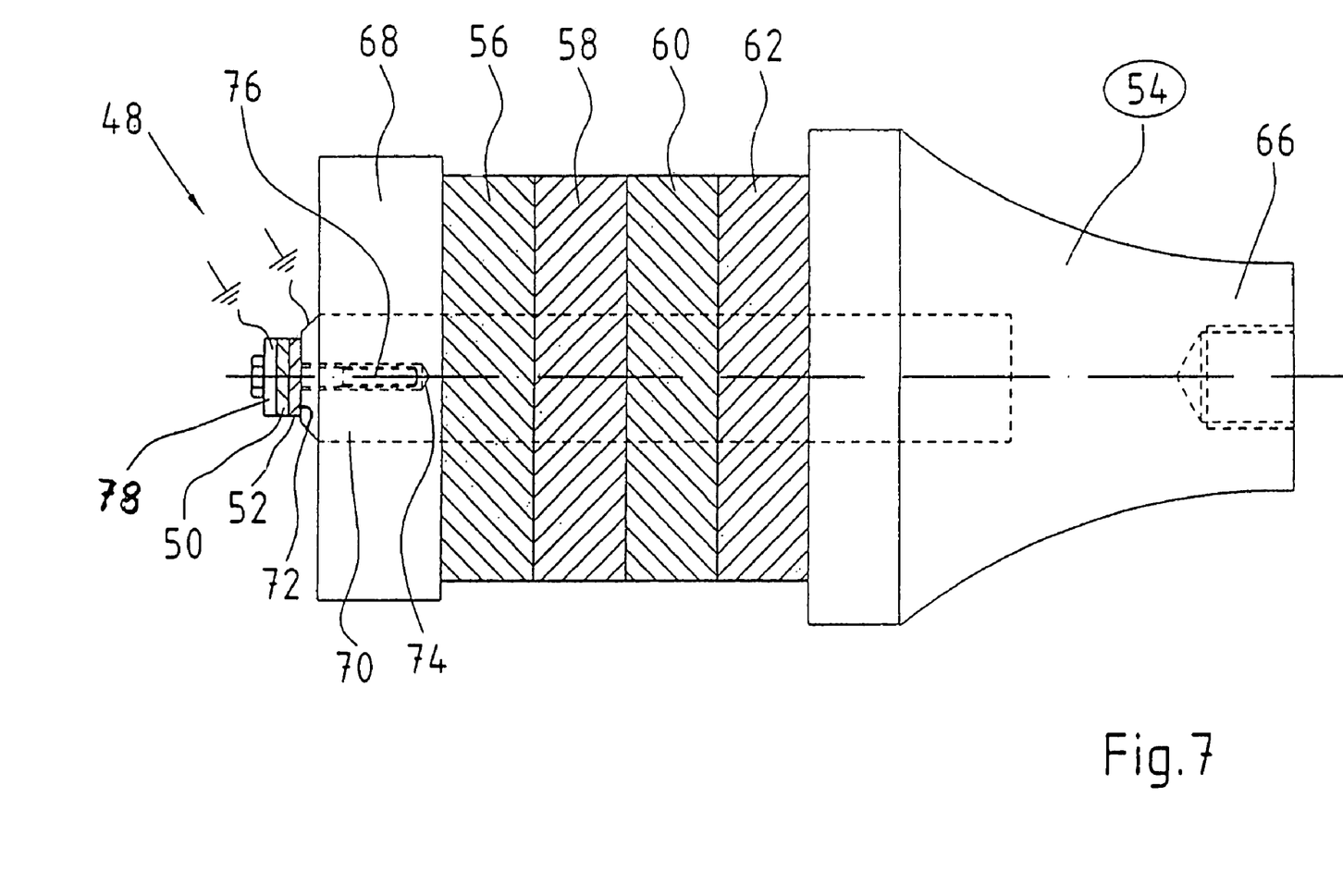
FIG. 7: A cutout of a converter.

FIG. 7 is a basic depiction of the arrangement of a piezo-electric sensor 48, which in the embodiment comprises two piezo-ceramic breaker plates 50, 52 that are delimited in the known manner by electrodes, which are not explained in more detail, in order to be able to access signals, which correspond to the oscillation amplitude of a converter 54 of an ultrasound welding device, as can be seen in FIG. 1.

The converter 54 in the embodiment comprises four first piezo-ceramic breaker plates 56, 58, 60, 62 on which a high frequency voltage coming from the generator, i.e. the control system 20, is present in order to expand or contract the discs 56, 58, 60, 62, thus producing oscillations of a desired amplitude. The piezo-ceramic breaker plates 56, 58, 60, 62 are tensioned between a so-called converter pin 66, which is connected to a booster or directly to a sonotrode, and a converter 68—also called a resonator—via a first bolt element 70. In this respect, however, reference is made to sufficiently known constructions. The bolt 70 protrudes beyond a converter nut 68 and has a tapped blind hole 74 starting at its end face 72 with internal threading into which a second bolt 76 is screwed, via which the piezo-ceramic breaker plates 50, 52 are tensioned between the end face 72 of the first bolt 70 and a nut 78. The sensor 48 formed from the piezo-ceramic discs 50, 52 runs in the maximum oscillation of the converter 54 and is frictionally connected thereto in such a manner via the two bolts 76, that an oscillation occurs in tune with the converter 54.

If the first piezo-ceramic breaker plates 56, 58, 60, 62 are designated as active component parts via which the oscillations in the converter 54 are produced, then the second piezo-ceramic breaker plates 50, 52 are passive components, since signals are produced with them as a function of the amplitude of the converter 54 and are sent to an evaluation unit in order to regulate the high frequency voltage present on the piezo-ceramic discs 56, 58, 60, 62 such that the converter 54 has the desired amplitudes, which in turn facilitate definite inferences about the amplitude of the booster or the sonotrode of the oscillator system.

In the process, the output signals of the sensor 48 can be calibrated in that the amplitude of the converter 54 is determined, for example, by means of a laser, and the output signal of the sensor 48 is calibrated to a standardized signal. Appropriate values can then be stored on a chip, which is associated with the oscillator or the converter 54 or is attached thereto.

Figure 8:
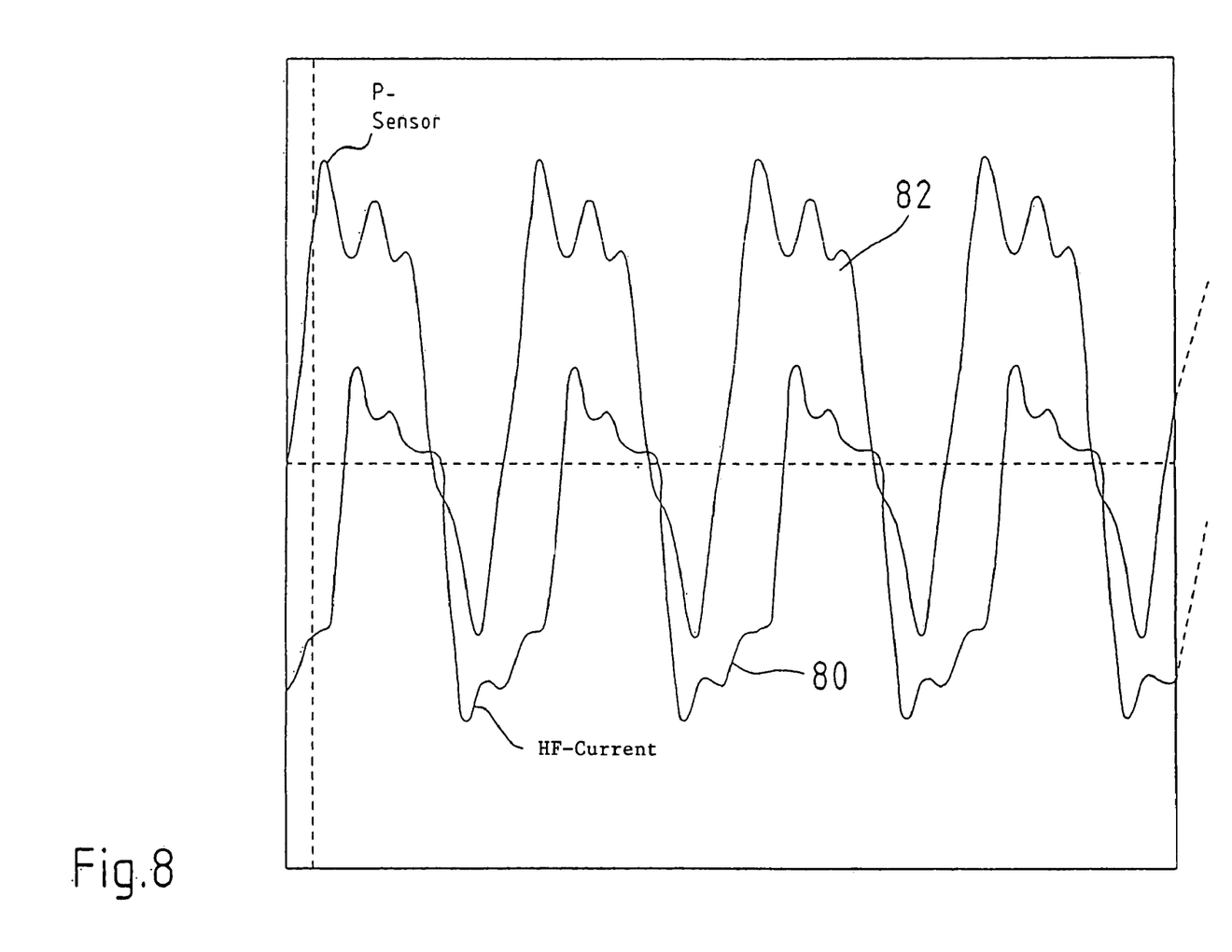
FIG. 8: Signal curves.

The fact that signals accessed from the sensor allow direct statements to be made about the amplitudes of the converter 54 can be seen in principle in FIG. 8. There a high frequency current measurement curve 80, which corresponds to the high frequency current flowing to the converter, and a curve 82, which corresponds to the signals of the sensor 48, are depicted. A direct comparison shows that the course of the curve of the sensor 48 can definitely be associated with the course of the curve of the high frequency current.

In order to evaluate the sensor signals, there are a variety of possibilities, of which some examples are shown in FIGS. 9 to 14.

Figure 9:
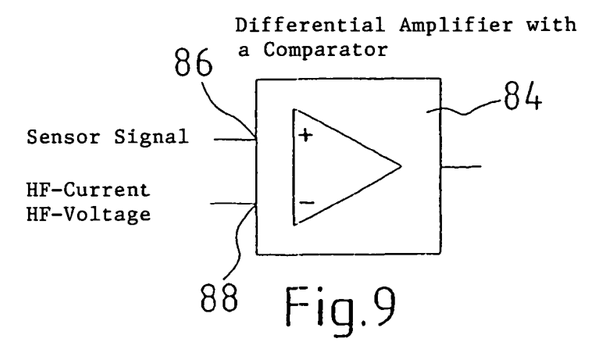
FIG. 9: A first evaluation circuit.
Figure 10:
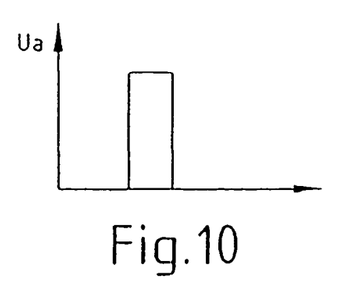
FIG. 10: A signal obtained from the first evaluation circuit.

In the process, a differential amplifier 84 with a comparator can be used for signal evaluation. Present at the inputs 86, 88 of the differential amplifier 84 are the sensor signals or high frequency current or voltage signals of the generator. The signals are compared and in the event of an impermissible deviation a signal is produced, which can be evaluated by the control system circuit. In the process, a signal shape develops, which corresponds to that of FIG. 10. The signals obtained are then applied to the digital input of a control system in order to regulate the high frequency voltage or the high frequency current, which is present at piezo-ceramic discs 56, 58, 60, 62 and flows to the converter.

Figure 11:
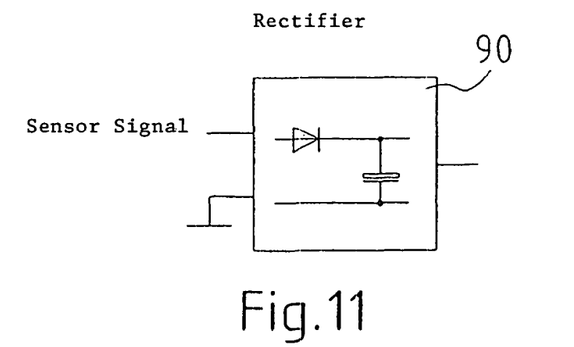
FIG. 11: A second evaluation circuit.
Figure 12:
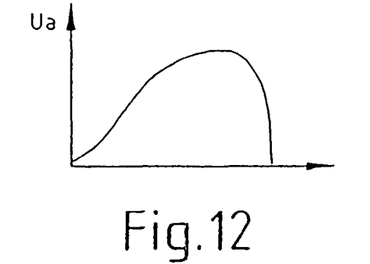
FIG. 12: A signal obtained from the second evaluation circuit.

There is also the possibility of evaluating the control signals by means of a rectifier circuit 90, as can clearly be seen in FIGS. 11 and 12. An analog direct voltage signal ranging between 0 and 10 volts is produced via the rectifier 90 and can be evaluated by the control system. The corresponding signal is then sent to an analog input of a control system of the high frequency voltage or the high frequency current.

Figure 13:
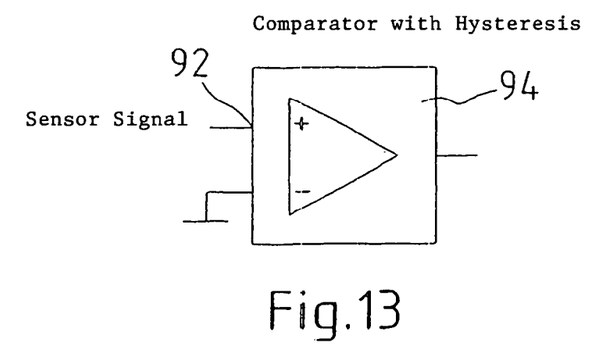
FIG. 13: A third evaluation circuit.
Figure 14:
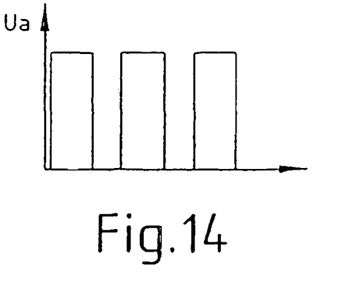
FIG. 14: A signal obtained from the third evaluation circuit.

To determine the oscillation frequency of the converter 54, the control signal can be present with hysteresis at an input 92 of a comparator 94. To determine the oscillation frequency, the sensor signal is transformed into pulses with the oscillation frequency and is sent to a counter input of a control system, such as a PLC control system.

The invention claimed is:

1. Ultrasound welding device comprising:
   component parts producing or transmitting oscillations, the device comprising:
   a converter comprising a plurality of piezo-ceramic discs which can be placed in oscillation, the plurality of discs being placed between a pin and a nut, and being tensioned by a first bolt element,
   a sonotrode,
   a space between the sonotrode and the backing electrode for placing compressible, weldable parts;
   and a piezo-ceramic sensor associated with at least one of the component parts, and being constructed and arranged for capturing amplitude of oscillation of the associated component part;
   wherein the first bolt element comprises a tapped blind hole starting an end face running from the nut and having an internal threading into which a second bolt is screwed, via which the piezo-ceramic sensor is tensioned with respect to the first bolt element.

2. Ultrasound welding device according to claim 1, wherein the piezo-ceramic sensor comprises at least two piezo-ceramic breaker plates, each of which has an outer diameter AD of 15 mm≧AD≧10 mm, and/or an inner diameter ID of 8 mm≧ID≧4/mm, and/or a thickness D of 1.5 mm≧D≧0.5mm.

3. Ultrasound welding device according to claim 2, wherein the piezo-ceramic breaker plates comprise electrodes made of baked silver.

4. Converter for an ultrasound welding device, which can be placed into oscillation having an amplitude with a high frequency voltage or a high frequency current, the converter comprising a plurality of first piezo-ceramic discs which can be place in oscillation and which are placed between a pin and a nut, and which are tensioned between the pin and the nut by a first bolt element, the first bolt element comprising a tapped blind hole starting at an end face running from the nut, with an internal threading into which a second bolt is screwed, via which a piezo-ceramic sensor capturing the amplitude is tensioned with respect to the first bolt element.

5. Converter according to claim 4, wherein the piezo-ceramic sensor comprises at least two piezo-ceramic breaker plates, each of which has an outer diameter AD of 15 mm≧AD≧10 mm, and/or an inner diameter ID of 8 mm≧ID≧4/mm, and/or a thickness D of 1.5 mm≧D≧0.5 mm.

6. Converter according to claim 5, wherein the piezo-ceramic breaker plates comprise electrodes made of baked silver.

7. Ultrasound welding device according to claim 1 further comprising a booster placed between the converter and the sonotrode.

8. A method for measuring and/or regulating the amplitude of a converter for an ultrasonic welding machine which comprises:

component parts producing or transmitting oscillations, the device comprising:
a converter comprising a plurality of piezo-ceramic discs which can be placed in oscillation, the plurality of discs being placed between a pin and a nut, and being tensioned by a first bolt element,
a sonotrode, and
a backing electrode associated with the sonotrode;
a space between the sonotrode and the backing electrode for placing compressible, weldable parts; and
a piezo-ceramic sensor associated with at least one of the component parts, and being constructed and arranged for capturing amplitude of oscillation of the associated component part;

wherein the first bolt element comprises a tapped blind hole starting an end face running from the nut and having an internal threading into which a second bolt is screwed, via which the piezo-ceramic sensor is tensioned with respect to the first bolt element;

a control circuit connected to the converter for sending thereto a high frequency voltage or current to produce ultrasound oscillations;

comprising the steps of:

comparing actual signals corresponding to oscillation amplitudes determined by the piezo-ceramic sensor with expected signals in the control circuit or a measuring and monitoring device, and varying an output signal of the control circuit as a function of deviations between the actual and expected signals, by means of which output signal the oscillations are produced.

9. A method according to claim 8, wherein alternating signals generated by the sensor by means of oscillation amplitudes, and/or direct voltage signals derived from the alternating signals are sent to the control system circuit or the measuring and monitoring device to regulate at least one output signal.

10. A method according to claim 8, wherein the sensor signals are fed to a differential amplifier with a comparator, with a high frequency voltage present in the converter or the piezo-ceramic discs or a flowing high frequency current, and an output signal of the comparator forms the basis for regulating the high frequency voltage or the high frequency current.

11. A method according to claim 8, wherein the sensor signals are sent to a rectifier circuit and a compensation voltage signal of the rectifier circuit forms the basis for regulating the high frequency voltage or the high frequency current.

12. A method according to claim 8, wherein the sensor signals are sent to a comparator and are transformed into voltage signals with an oscillation frequency of the signals and sent to a counter.

13. A method according to claim 8 wherein the component parts producing or transmitting oscillations of ultrasonic welding machine further comprises a booster placed between the converter and the sonotrode.

* * * * *